Nov. 4, 1941.  W. W. MOHR  2,261,269
VALVE BODY AND BONNET CONSTRUCTION
Filed Nov. 16, 1939   2 Sheets-Sheet 1
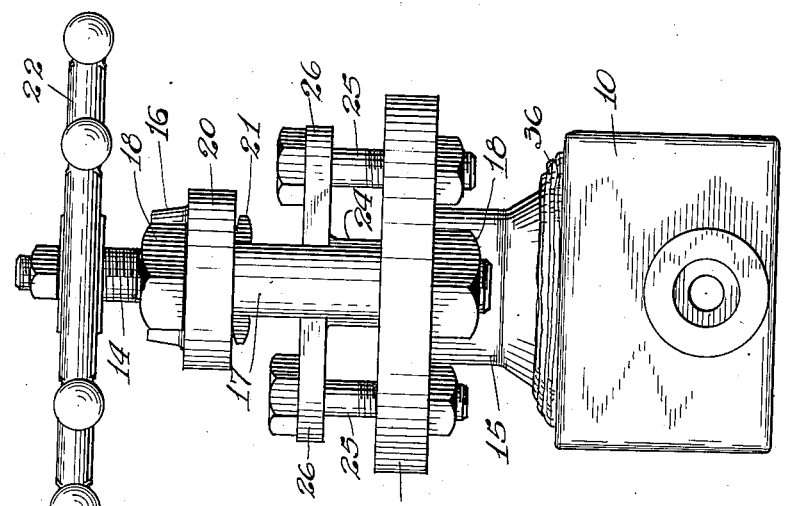
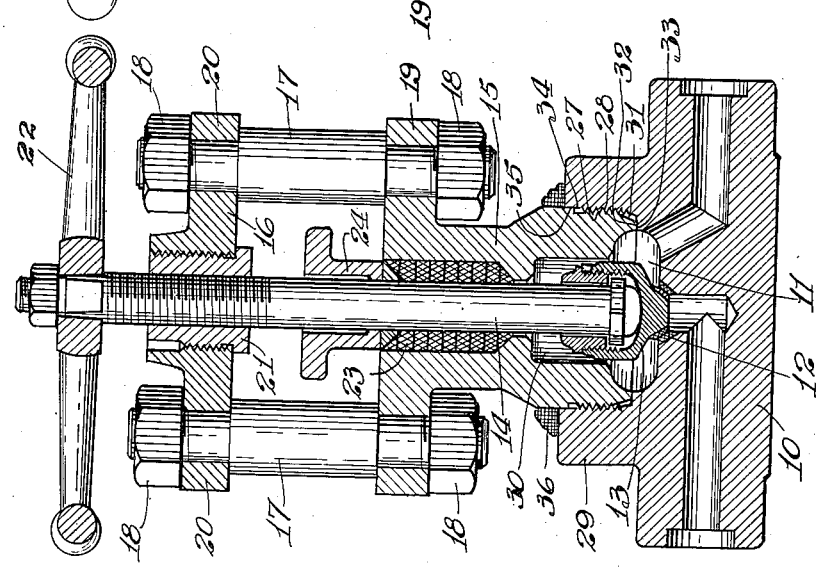
INVENTOR.
WALTER W. MOHR.
BY Albert E. Bell
ATTORNEY.

Nov. 4, 1941.                W. W. MOHR                2,261,269
                VALVE BODY AND BONNET CONSTRUCTION
                   Filed Nov. 16, 1939        2 Sheets-Sheet 2
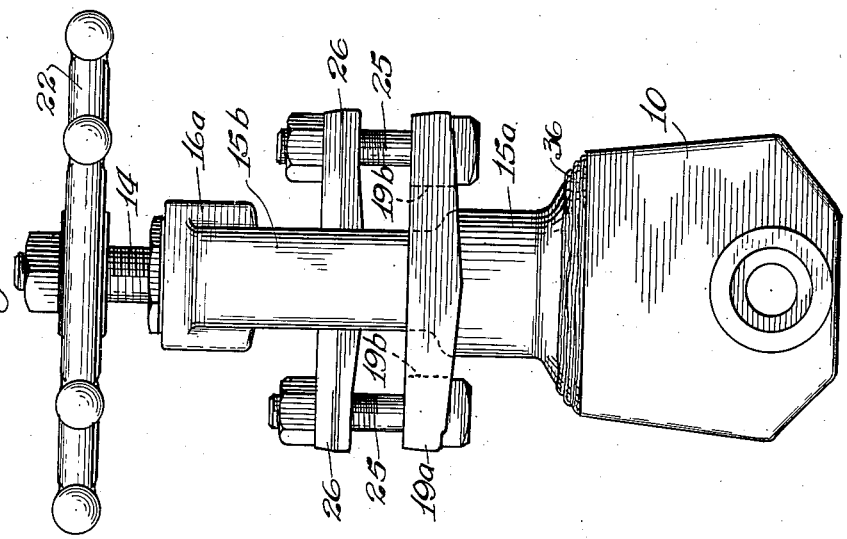
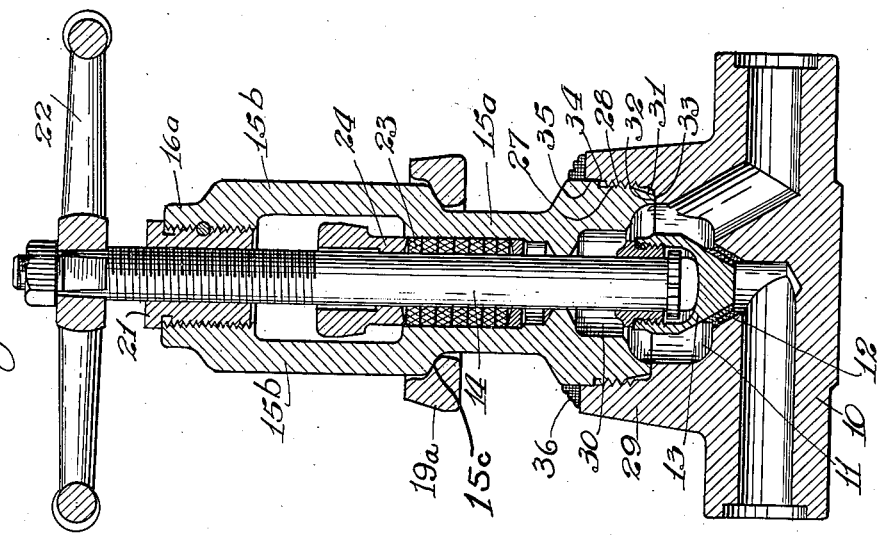
INVENTOR.
WALTER W. MOHR.
BY Albert C. Bell
ATTORNEY.

Patented Nov. 4, 1941

2,261,269

UNITED STATES PATENT OFFICE 2,261,269

VALVE BODY AND BONNET CONSTRUCTION

Walter W. Mohr, Calumet City, Ill., assignor to The Edward Valve & Manufacturing Co. Inc., East Chicago, Ind., a corporation of Indiana Application November 16, 1939, Serial No. 304,717

3 Claims. (Cl. 251—156)

My invention pertains to valve and bonnet constructions for use with high pressures or high temperatures or both, in which said parts are made of steel and the body and bonnet are separate parts to facilitate the machining of the passages and internal structure of said parts.

Heretofore in making such steel valve and bonnet constructions, said parts have commonly been connected together for use either by means of flanges on said parts and connecting bolts, or by means of cooperating threads on said parts, or by welding the parts together. The flange and bolt construction is open to the objections that the flanges are relatively expensive to make on the steel parts, and that the connecting bolts are in a highly heated zone which, by repeated expansion and contraction due to repeated heating and cooling frequently loosens the joint between the parts in time, regardless of how tightly the joint is made in the beginning. The threaded joint construction is open to the objection that repeated expansion and contraction due to the repeated heating and cooling, soon loosens the joint regardless of how tightly the parts are screwed together originally. The welded joint construction is open to a similar objection and to the further objection that where the weld is depended upon to withstand the high pressures in the valve body, the welding material which is in the highly heated zone, is soon deformed sufficiently to facilitate the development of leaks through said material. Another objection to welded joints as heretofore produced, is that in cases where the valve disk or its seat requires repair, it is practically impossible to separate the bonnet from the valve body without destroying the valve body or bonnet.

It is to be borne in mind that valves of the kind here involved are in many cases required to operate with fluid pressures that are very high, for example, up to 6000 pounds per square inch, that in many other cases they may be required to operate with fluid temperatures that are very high, for example, up to 1200 degrees Fahrenheit, and that in still other cases they are frequently required to operate with fluid pressures and temperatures that are both high, for example, pressures as high as 4000 pounds per square inch and at the same time temperatures as high as 950 degrees Fahrenheit. Under such extreme conditions of operation, it is extremely difficult by any practice heretofore known, to produce a joint between a valve body and a bonnet that will not soon develop leaks in use.

By the present invention I provide a joint between a valve body and bonnet of the steel type for high pressure and high temperature service, in which the objections of previous practice are overcome and which will withstand high pressure and high temperature for long periods of time without developing leaks and which permits separating the bonnet from the valve body for internal repairs, without difficulty and without injuring the valve body or the bonnet.

In carrying out my invention I provide the valve body and the bonnet with cooperating threads and cooperating internal seating surfaces, so that when the parts are tightly screwed together, said seating surfaces are pressed tightly together to make a tight joint; I further provide the adjacent external surfaces of the body and bonnet with conformations of such a kind that welding material may effectively be applied to them to further seal the joint and to have the further desirable effect of even more tightly pressing said seating surfaces together when the welding material cools, leaving the connected parts in a condition of stress that in large part is within the elastic limit of the body and bonnet; the conformation of the external adjacent surfaces of the body and bonnet is particularly directed to the further desirable effects of not permitting the welding material to enter between the parts, and of placing the welding material in a location readily accessible in a lathe or similar machine by which the welding material may readily be removed when it is desirable to separate the bonnet from the body.

The above and other objects of my invention will more fully appear below in connection with the drawings illustrating a preferred embodiment thereof, as follows:

Fig. 1 is a central, vertical sectional view through a valve construction involving my invention, Fig. 2 is a side elevation of the structure shown in Fig. 1, Fig. 3 shows in a view similar to Fig. 1, a modified valve construction, and Fig. 4 is a side elevation of the structure shown in Fig. 3.

Similar numerals refer to similar parts throughout the several views.

As shown in Figs. 1 and 2, the valve construction consists of a body 10, having inlet and outlet passages communicating with an inner compartment 11 provided with a valve seat 12 for engagement by a valve disk 13 carried by the lower end of a valve stem 14 supported by a bonnet 15 and yoke 16 for movement with said valve disk towards and from said valve seat 12. Threaded posts 17 engaged by nuts 18 rigidly engage a flange 19 and arms 20 formed integrally with the bonnet 15 and yoke 16 respectively. The yoke 16 has threaded therein a bushing 21 which is internally threaded to engage the threaded upper end portion of the stem 14, which stem has secured to its upper end, a hand wheel 22 for operating the valve.

The bonnet 15 contains packing material 23 held tightly around the stem 14 by a gland 24 by the action of gland bolts 25 (Fig. 2), which extend through the flange 19 and also through arms 26 projecting laterally from the gland 24 between the posts 17.

The bonnet 15 is cylindrical and is provided on its lower end portion with external threads 27 closely fitting similar internal threads 28 formed in a cylindrical extension 29 integral with the body 10. The compartment 11 is continued into the lower end of the bonnet 15 and extends upwardly therein in the form of a counterbore 30 to receive the valve disk 13 for the open condition of the valve.

The threads 27 and 28 terminate a short distance above the lower end of the bonnet 15 and below the threads the bonnet is of sufficiently reduced external diameter to be spaced laterally from the body 10, as shown at 31. The lower end surface of the bonnet 15 is preferably flat or substantially so and perpendicular to the axis of the bonnet to form an end seat 32 accurately engaging with as close a fit as can be provided practically, a corresponding seat 33 formed in the body 10, the seats 32 and 33 by tightly engaging each other, serving to present fluid under pressure in the compartment 11, from reaching the threads 27 and 28.

The upper end surface of the body extension 29 is preferably perpendicular to the axis of the said extension and to the axis of the bonnet 15, and the threads 27 and 28 terminate a short distance below said upper end surface, above which threads said body extension 29 is provided with a smooth and true bore 34 of somewhat larger diameter than the external diameter of the threads 27, closely fitting a smooth and true cylindrical surface 35 on the bonnet 15, which extends from a safe clearance distance above the threads 28, to a position sufficiently above the end surface of the extension 29, to receive welding material 36 in the angle formed by said end surface and the projecting portion of said cylindrical surface 35, which welding material is fused into the upper end material of the extension 29 and into the material of the external portion of the surface 35 without perceptibly entering the bore 34.

The seats 32 and 33 are preferably hardened by heat treatment or by hard surfacing, so that the accurately finished and fitted seats will be as strongly resistant to deformation as possible under the action of high pressure and heat.

In assembling the valve construction described, the bonnet 15 with the stem 14 and valve disk 13 mounted in it, is first screwed into the body 10 as tightly as the strength of the threads 27 and 28 will safely permit, thereby forcing the seats 32 and 33 tightly into engagement with each other. In this condition the valve structure is tested to determine whether the valve disk 13 and the valve seat 12 engage each other properly to prevent fluid flow from the inlet passage to the outlet passage, and to also determine whether the joint between the seats 32 and 33 is fluid tight, for if the latter is not the case, seepage will occur through the threads 27 and 28 and around the surface 35 which can be detected, with the high testing pressures employed. If the testing develops any internal defects, the bonnet 15 may readily be removed from the body 10 and the defects may be remedied. If the testing develops no defects, it would appear that the valve structure might be ready for actual use, but I find that in that condition, the contractions and expansions of the parts due to high pressures and high temperatures in actual use, frequently cause prohibitive leakage between the seats 32 and 33 after a short time of use, regardless of how tightly said seats may be forced together originally by the threads 27 and 28.

To complete my construction, with the seats 32 and 33 tightly forced together as described, and after testing fails to develop defects, the welding material 36 is applied in such a manner as to fuse into the end material of the extension 29 and into the material of the surface 35, care being taken that the fusing action shall not extend perceptibly on the surface 35 below the end surface of the extension 29, and care also being taken that a considerable bulk of the welding material shall be so applied, filling a substantial part of the angle between the surface 35 and the end surface of the extension 29. I find that the welding material so applied produces a superior and permanent seal between the body 10 and the bonnet 15, not possible where the threads 27 and 28 are depended upon without the welding material 36, and not possible where the threads 27 and 28 are omitted and the welding material 36 alone is depended upon to effect the seal. The only explanation I can find for the superior results attained by my valve structure, is that the welding material can only effectively accomplish its purpose where the seats 32 and 33 are tightly forced together during the application of the welding material and where said seats are held tightly forced together during the cooling of the welding material. My view is that tightly forcing the seats 32 and 33 together by the threads 27 and 28, produces internal stresses in the extension 29 and in the lower end portion of the bonnet 15, which are to a considerable degree localized adjacent the threads and the seats, with the result that the seats are not forced together with equal unit pressures over their entire areas of contact, and that with this initial internal condition of the parts, the cooling and contraction of the welding material, which has a large area of engagement with the body extension and with the bonnet, and has also a large cross-section, actually forces the seats 32 and 33 more tightly together, and in so doing, more uniformly distributes the internal stresses in the lower end portion of the bonnet and in the extension 29, with the result that the pressure distribution over the contacting faces of the seats 32 and 33, is uniform, or substantially so.

In the event it is necessary to effect internal repairs in a valve structure made as described, the body 10 may be mounted for rotation in a lathe or other turning machine, with the bonnet axis coaxial with the axis of rotation, and the welding material 36 may be quickly and effectively cut from the bonnet and from the extension 29, after which the bonnet may readily be unscrewed from the valve body, without injury either to the bonnet or the body.

The valve construction shown in Figs. 3 and 4 is the same as above described as to the manner of securing the bonnet to the valve body, and the parts are the same although somewhat differently proportioned, excepting the upper portion of the bonnet construction and the manner of holding the gland in place against the gland packing. In this case the bonnet 15a is not provided with an integral flange, but has two diametrically opposite integral arms 15b substantially parallel with the stem 14, which at their upper ends are integral with a collar 16a which is internally threaded to engage and support the bushing 21. The diameter over the arms 15b is substantially larger than the outside diameter of the tubular portion of the bonnet below said arms, to form shoulders 15c at the lower ends of said arms to engage a flange collar 19a which is separate from the bonnet and which is restrained against upward movement by said shoulders, for the angular position of said collar shown in Figs. 3 and 4.

The bolts 25 extend through the collar 19a and the arms 26, to hold the gland 24 against the packing 23. The central opening through the collar 19a is larger longitudinally of the collar as indicated at 19b in Fig. 4, than it is laterally of the collar as shown in Fig. 3, so that by turning the collar substantially 90 degrees on the bonnet 15a from its position illustrated in Figs. 3 and 4, the collar may be moved over and longitudinally of the arms 15b for assembling and dismantling purposes. The valve structure illustrated in Figs. 3 and 4 is more compact than that illustrated in Figs. 1 and 2, and is well adapted for certain classes of service. The advantages and explanation of my improved means connecting the bonnet with the body of the valve, given above in connection with Figs. 1 and 2, apply with equal force and effect to the construction shown in Figs. 3 and 4.

From the above it will appear that by my invention above described, I have produced a valve construction having marked advantages, particularly where fluid must be controlled under high pressures, for example, up to 6000 pounds per square inch, or at high temperatures, for example up to 1200 degrees Fahrenheit, or where in some cases the fluid pressure may be as high as 4000 pounds per square inch at the same time that the temperature of said fluid is as high as 950 degrees Fahrenheit.

In describing the body and bonnet of my valve construction as "steel" parts, I include within the meaning of that term that said parts may be steel forgings, steel castings and parts made from steel bars, as preferred in any case, and that the material employed may be steel of any composition or steel alloy of any suitable kind, as preferred. The other parts of my valve construction may be made of any materials and in any manner adapted respectively to meet the requirements of said other parts.

While I have shown my invention in the particular embodiments above described, I do not limit myself thereto as I may employ equivalents thereof without departing from the scope of the appended claims.

What I claim is:

1. In a valve construction of the class described, the combination of a steel body having inlet and outlet passages and an internal compartment communicating with said passages, said body having an integral tubular extension projecting therefrom and communicating with said compartment, a steel bonnet having a tubular end portion projecting into said extension, said body having an annular seat around said compartment tightly engaging the annular end surface of said bonnet end portion, said bonnet end portion and said body extension having cooperating threads tightly holding said bonnet end against said body seat, said extension having an outer end surface at an angle to the adjacent projecting surface of the bonnet, and welding material in and filling a substantial part of said angle and fused to said extension end surface and to the adjacent projecting surface of said bonnet and increasing the holding pressure of said bonnet end against said body seat, said body extension and said bonnet end portion having tightly engaging cylindrical surfaces between the end of said body extension and said threads, said bonnet cylindrical surface extending outwardly beyond the end of said body extension.

2. In a valve construction of the class described, the combination of a steel body having inlet and outlet passages and an internal compartment communicating with said passages, said body having an integral tubular extension projecting therefrom and communicating with said compartment, a steel bonnet having a tubular end portion projecting into said extension, said body having an annular seat around said compartment tightly engaging the annular end surface of said bonnet end portion, said bonnet end portion and said body extension having cooperating threads tightly holding said bonnet end against said body seat, said extension having an outer end surface at an angle to the adjacent projecting surface of the bonnet, and welding material in and filling a substantial part of said angle and fused to said extension end surface and to the adjacent projecting surface of said bonnet and increasing the holding pressure of said bonnet end against said body seat, the outer end surface of said body extension being substantially perpendicular to the adjacent side surface of said bonnet, whereby said welding material in its cooled and contracted condition exerts a substantial axial pressure of said bonnet end upon said body seat.

3. In a valve construction of the class described, the combination of a steel body having inlet and outlet passages and an internal compartment communicating with said passages, said body having an integral tubular extension projecting therefrom and communicating with said compartment, a steel bonnet having a tubular end portion projecting into said extension, said body having an annular seat around said compartment tightly engaging the annular end surface of said bonnet end portion, said bonnet end portion and said body extension having cooperating threads tightly holding said bonnet end against said body seat, said extension having an outer end surface at an angle to the adjacent projecting surface of the bonnet, and welding material in and filling a substantial part of said angle and fused to said extension end surface and to the adjacent projecting surface of said bonnet and increasing the holding pressure of said bonnet end against said body seat, the outer end surface of said body extension being substantially perpendicular to the adjacent side surface of said bonnet, whereby said welding material in its cooled and contracted condition exerts a substantial axial pressure of said bonnet end upon said body seat, there being a clearance space between the outer surface of said bonnet end portion and said body inside of said threads.

WALTER W. MOHR.